(12) United States Patent
Laricchia et al.

(10) Patent No.: US 9,327,211 B2
(45) Date of Patent: *May 3, 2016

(54) PROCESS FOR REMOVING CARBONYL SULFIDE IN A GAS PHASE HYDROCARBON STREAM AND APPARATUS RELATING THERETO

(71) Applicant: UOP, LLC, Des Plaines, IL (US)

(72) Inventors: Luigi Laricchia, Arlington Heights, IL (US); Jessy E. Trucko, Lake Forest, IL (US)

(73) Assignee: UOP LLC, Des Plaines, IL (US)

( * ) Notice: Subject to any disclaimer, the term of this patent is extended or adjusted under 35 U.S.C. 154(b) by 227 days.

This patent is subject to a terminal disclaimer.

(21) Appl. No.: 13/920,532

(22) Filed: Jun. 18, 2013

(65) Prior Publication Data

US 2014/0371508 A1    Dec. 18, 2014

(51) Int. Cl.
| | |
|---|---|
| *B01D 11/04* | (2006.01) |
| *C10G 70/06* | (2006.01) |
| *C10G 70/00* | (2006.01) |
| *B01D 11/00* | (2006.01) |

(52) U.S. Cl.
CPC ............ *B01D 11/04* (2013.01); *C10G 70/006* (2013.01); *C10G 70/06* (2013.01); *B01D 2011/007* (2013.01)

(58) Field of Classification Search
None
See application file for complete search history.

(56) References Cited

U.S. PATENT DOCUMENTS

| | | |
|---|---|---|
| 2,230,654 A | 2/1941 | Plunkett |
| 2,594,311 A | 4/1952 | Johnson et al. |
| 2,726,992 A | 12/1955 | Easthagen et al. |
| 3,497,569 A | 2/1970 | Stiles |
| 4,199,440 A | 4/1980 | Verachtert |
| 4,208,541 A | 6/1980 | McClure |
| 4,336,233 A | 6/1982 | Appl et al. |
| 4,461,749 A | 7/1984 | Thorn |
| 4,490,246 A | 12/1984 | Verachtert |
| 4,562,300 A | 12/1985 | LaFoy |
| 4,626,341 A | 12/1986 | Verachtert |
| 4,666,689 A | 5/1987 | Maple et al. |
| 4,735,704 A | 4/1988 | Kister et al. |
| 4,808,765 A | 2/1989 | Pearce et al. |
| 4,957,715 A | 9/1990 | Grover et al. |
| 5,149,340 A | 9/1992 | Waycuilis |

(Continued)

FOREIGN PATENT DOCUMENTS

| | | |
|---|---|---|
| EP | 0227259 A1 | 7/1987 |
| GB | 815193 | 6/1959 |
| WO | 2005121279 | 12/2005 |

OTHER PUBLICATIONS

"New Developments . . . Coalescers Eliminate Gasoline Haze", Hydrocarbon Processing, Feb. 2001, vol. 80, No. 2, pp. 118, 124.

(Continued)

*Primary Examiner* — Tam M Nguyen

(57) ABSTRACT

One exemplary embodiment can be a process for removing carbonyl sulfide in a gas phase hydrocarbon stream. The process may include combining the gas phase hydrocarbon stream with another stream including an alkali and an alkanolamine, and passing the combined stream to a prewash zone including a vessel. The gas phase hydrocarbon may include carbonyl sulfide, and the alkali can include at least one of potassium hydroxide, sodium hydroxide, and ammonia. Usually, the vessel contains a contacting zone and a coalescing zone for removing the carbonyl sulfide.

19 Claims, 1 Drawing Sheet

(56) References Cited

U.S. PATENT DOCUMENTS

| | | |
|---|---|---|
| 5,246,619 A | 9/1993 | Niswander |
| 5,271,835 A | 12/1993 | Gorawara et al. |
| 5,456,661 A | 10/1995 | Narciso, Jr. |
| 5,523,069 A | 6/1996 | Lin |
| 5,601,702 A | 2/1997 | Yan |
| 5,698,171 A | 12/1997 | Trauffer et al. |
| 5,877,386 A | 3/1999 | Schubert |
| 5,997,731 A | 12/1999 | Suarez |
| 6,334,949 B1 | 1/2002 | Bruno et al. |
| 6,852,144 B1 | 2/2005 | Wagner et al. |
| 7,119,244 B2 | 10/2006 | Smith, Jr. |
| 7,223,332 B1 | 5/2007 | Tertel |
| 7,326,333 B2 | 2/2008 | Laricchia et al. |
| 7,381,309 B1 | 6/2008 | Laricchia et al. |
| 7,604,724 B2 | 10/2009 | Mortson |
| 7,875,185 B2 | 1/2011 | Zhang |
| 8,028,975 B2 | 10/2011 | Tertel et al. |
| 8,080,087 B2 | 12/2011 | Falkiner et al. |
| 8,088,281 B2 | 1/2012 | Falkiner et al. |
| 8,173,856 B2 | 5/2012 | Tertel |
| 8,308,957 B2 | 11/2012 | Zhang et al. |
| 8,313,718 B2 | 11/2012 | Bedell |
| 2009/0134068 A1 | 5/2009 | Falkiner et al. |
| 2009/0151237 A1 | 6/2009 | Takegoshi et al. |
| 2011/0142738 A1 | 6/2011 | Pandya et al. |
| 2012/0000827 A1 | 1/2012 | Krupa et al. |

OTHER PUBLICATIONS

Doran et al., "Removal of Trace H2S and COS from Liquid Streams", Petroleum Technology Quarterly, Autumn 1996, pp. 41-44.

Pai et al., "Gas Processing Options for Mercaptans and Carbonyl Sulfide Removal from NG and NGL Streams", AIChE 1993 Spring National Meeting Presentation paper, Mar. 28, 1993, Number Preprint N.75g, p. 25 pages.

McClure et al., "Amine Process Removes COS from Propane Economically", The Oil and Gas Journal, Jul. 2, 1979, vol. 77, No. 27, pp. 106-108.

Nielsen et al., "Treat LPGs with Amines", Hydrocarbon Processing, Sep. 1997, vol. 76, No. 9, pp. 49-50, 53-54, 56, 58-59.

"Coalescer Removes Dispersed, Nondissolved Liquid Contaminants", Chemical Engineering Progress, Apr. 2001, vol. 97, No. 4, p. 27.

Weber et al., "The Cosden/Malaprop Process for Light Hydrocarbon Desulfurization", National Petroleum Refiners Association 1981 NPRA Annual Meeting Presentation, Mar. 29-31, 1981, No. PAP.N. AM-81-49, p. 14 pages.

Wines et al., "Difficult Liquid—High-Performance, Polymer-Fiber Coalescers Break Up Hard-to-Handle Emulsions and Dispersions", Chemical Engineering, vol. 104, No. 12, Dec. 1997, pp. 104-109.

U.S. Appl. No. 13/920,407, filed Jun. 18, 2013, Laricchia.
U.S. Appl. No. 13/920,432, filed Jun. 18, 2013, Laricchia.
U.S. Appl. No. 13/920,477, filed Jun. 18, 2013, Laricchia.
U.S. Appl. No. 13/920,507, filed Jun. 18, 2013, Laricchia.

Search Report dated Oct. 16, 2014 for corresponding PCT Appl. No. PCT/US2014/042452.

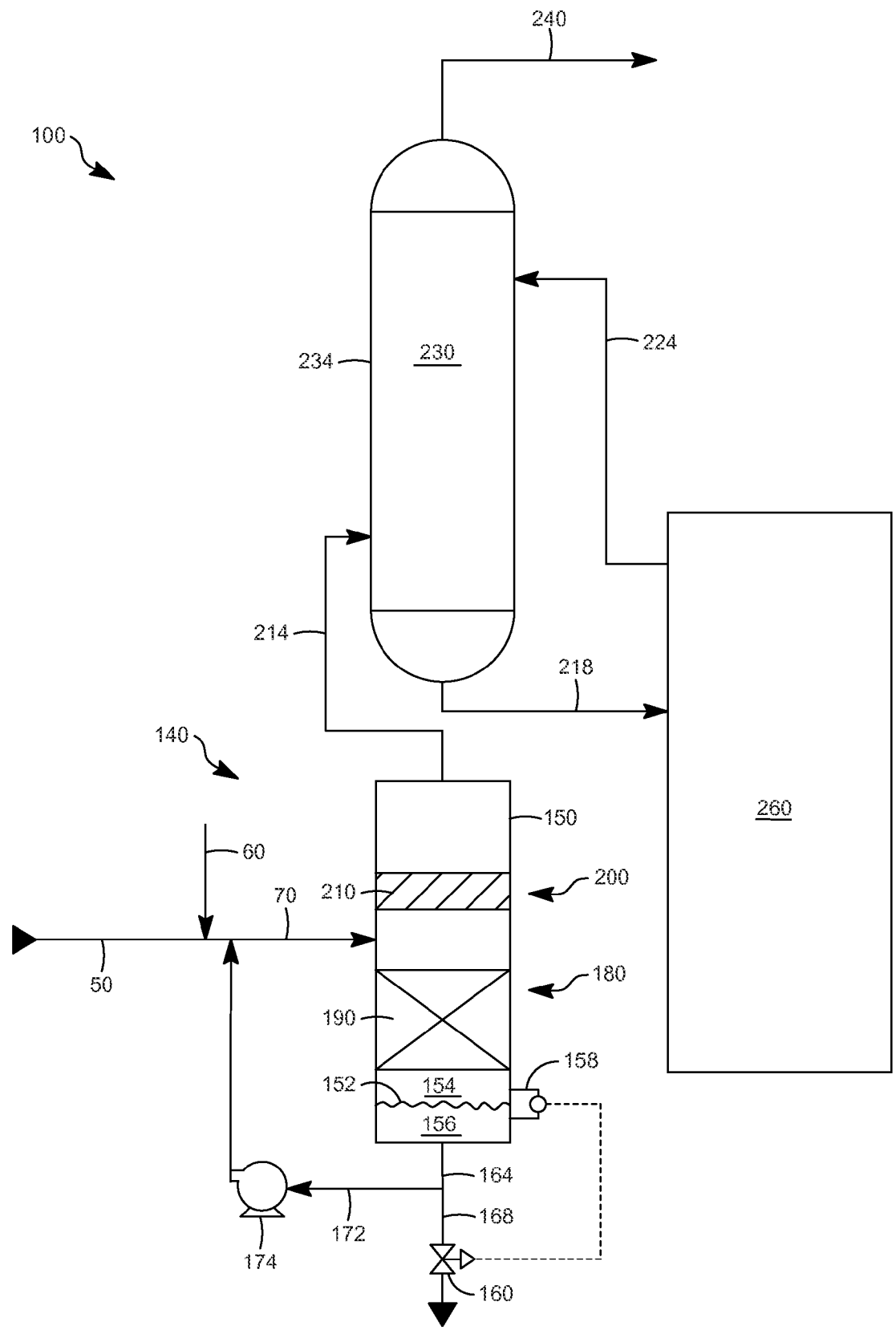

PROCESS FOR REMOVING CARBONYL SULFIDE IN A GAS PHASE HYDROCARBON STREAM AND APPARATUS RELATING THERETO

FIELD OF THE INVENTION

This invention generally relates to a process for removing carbonyl sulfide in a gas phase hydrocarbon stream and an apparatus relating thereto.

DESCRIPTION OF THE RELATED ART

A sulfur removal process can extract mercaptan from a hydrocarbon stream to a caustic stream. In a sulfur extraction unit, caustic extracts mercaptan from a hydrocarbon stream. These mercaptides may then be oxidized to disulfides by adding air and catalyst, and running the stream through an oxidizer.

Generally, it is desirable to remove carbonyl sulfide along with the mercaptan compounds. However, such removal processes can be more cost competitive if the number of pieces of equipment are to be reduced, such as eliminating the carbonyl sulfide removal system in the post treatment section of the extraction unit. Usually, several valve trays are used to meet carbonyl sulfide and caustic specs. Other shortcomings of the current carbonyl sulfide systems can be upsetting units located downstream due to carbonyl solvent carryover and may be limited to a single solvent, such as monoethanolamine Hence, there is a desire to provide systems with fewer vessels and have greater flexibility with respect to solvents.

SUMMARY OF THE INVENTION

One exemplary embodiment can be a process for removing carbonyl sulfide in a gas phase hydrocarbon stream. The process may include combining the gas phase hydrocarbon stream with another stream including an alkali and an alkanolamine, and passing the combined stream to a prewash zone including a vessel. The gas phase hydrocarbon may include carbonyl sulfide, and the alkali can include at least one of potassium hydroxide, sodium hydroxide, and ammonia. Usually, the vessel contains a contacting zone and a coalescing zone for removing the carbonyl sulfide.

Another exemplary embodiment may be a process for removing at least one carbonyl sulfide and hydrogen sulfide in a gas phase hydrocarbon stream. The process may include combining the gas phase hydrocarbon stream including carbonyl sulfide with another stream comprising an alkali and an alkanolamine, and passing the combined stream to a prewash zone having a vessel. Often, the vessel contains one or more trays and a coated mesh for removing at least one of the carbonyl sulfide and hydrogen sulfide.

A further exemplary embodiment may be an apparatus for removing carbonyl sulfide from a gas phase hydrocarbon stream. The apparatus may include a prewash zone having a vessel, an extraction zone downstream from the prewash zone, and an alkali regeneration zone. Usually, the vessel has one or more trays and a coated mesh.

The embodiments provided herein can remove carbonyl sulfide compounds in pretreatment instead of post treatment. As such, the costs can be reduced by eliminating carbonyl sulfide removal valve trays from a post treatment section and eliminate solvent carryover into downstream units. Moreover, the embodiments disclosed herein can provide flexibility in operations by allowing a choice of solvent, such as monoethanolamine or diethanolamine. Moreover, revamps can be expedited by replacing prewash caustic with a carbonyl sulfide solvent.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. In addition, the term "stream" may be applicable to other fluids, such as aqueous and non-aqueous solutions of alkaline or basic compounds, such as sodium hydroxide.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can refer to an amount of at least generally about 50%, preferably about 70%, by mole, of a compound or class of compounds in a stream. If referring to a solute in solution, e.g., one or more disulfide compounds in an alkaline solution, the term "rich" may be referenced to the equilibrium concentration of the solute. As an example, about 5%, by mole, of a solute in a solvent may be considered rich if the concentration of solute at equilibrium is about 10%, by mole.

As used herein, the term "substantially" can refer to an amount of at least generally about 80%, preferably about 90%, and optimally about 99%, by mole, of a compound or class of compounds in a stream.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g., a screw, a nail, a bolt, a staple, or a rivet; an adhesive; or a solder.

As used herein, the term "coalescer" may be a device containing glass fibers or other material to facilitate separation of immiscible liquids of similar density.

As used herein, the term "immiscible" can refer to two or more phases that cannot be uniformly mixed or blended.

As used herein, the term "phase" may refer to a liquid, a gas, or a suspension including a liquid and/or a gas, such as a foam, aerosol, or fog. A phase may include solid particles. Generally, a fluid can include one or more gas, liquid, and/or suspension phases.

As used herein, the term "alkali" can refer to any substance that in solution, typically a water solution, has a pH value greater than about 7.0, and exemplary alkali can include sodium hydroxide, potassium hydroxide, or ammonia. Such an alkali in solution may be referred to as "an alkaline solution" or "an alkaline" and includes caustic, i.e., sodium hydroxide in water.

As used herein, the term "parts per million" may be abbreviated herein as "ppm" and "weight ppm" may be abbreviated herein as "wppm".

As used herein, the term "mercaptan" typically means a thiol and may be used interchangeably therewith, and can include compounds of the formula RSH as well as salts thereof, such as mercaptides of the formula $RS^-M^+$ where R is a hydrocarbon group, such as an alkyl or aryl group, that is saturated or unsaturated and optionally substituted, and M is a metal, such as sodium or potassium.

As used herein, the term "disulfides" can include dimethyldisulfide, diethyldisulfide, and ethylmethyldisulfide, and possibly other species having the molecular formula RSSR' where R and R' are each, independently, a hydrocarbon group, such as an alkyl or aryl group, that is saturated or unsaturated and optionally substituted. Typically, a disulfide is generated from the oxidation of a mercaptan-containing caustic and forms a separate hydrocarbon phase that is not soluble in the aqueous caustic phase. Generally, the term "disulfides" as used herein excludes carbon disulfide ($CS_2$).

As used herein, the weight percent or ppm of sulfur, e.g., "wppm-sulfur" is the amount of sulfur, and not the amount of the sulfur-containing species unless otherwise indicated. As an example, methylmercaptan, $CH_3SH$, has a molecular weight of 48.1 with 32.06 represented by the sulfur atom, so the molecule is about 66.6%, by weight, sulfur. As a result, the actual sulfur compound concentration can be higher than the wppm-sulfur from the compound. An exception is that the disulfide content in caustic can be reported as the wppm of the disulfide compound.

As used herein, the term "lean caustic" is a caustic having been treated and having desired levels of sulfur, including one or more mercaptans and one or more disulfides for treating one or more C1-C4 hydrocarbons in an extraction zone.

As used herein, the term "regeneration" with respect to a solvent stream can refer to removing one or more disulfide sulfur species from the solvent stream to allow its reuse.

As depicted, process flow lines in the figures can be referred to, interchangeably, as, e.g., lines, pipes, branches, distributors, streams, effluents, feeds, products, portions, catalysts, withdrawals, recycles, suctions, discharges, and caustics.

BRIEF DESCRIPTION OF THE DRAWING

The FIGURE is a schematic depiction of an exemplary apparatus.

DETAILED DESCRIPTION

Referring to the FIGURE, an exemplary apparatus 100 for removing carbonyl sulfide from a gas phase hydrocarbon stream can include a prewash zone 140 and an extraction zone 230 downstream from the prewash zone 140, as well as an alkali regeneration zone 260. A hydrocarbon stream 50, typically substantially in the gas phase, including one or more $C4^-$ hydrocarbons, such as a fuel gas, and about 50-about 500 ppm, by weight, of carbonyl sulfide can be provided to the apparatus 100. The hydrocarbon stream 50 may include other sulfur compounds, such as hydrogen sulfide. Generally, the hydrocarbon stream 50 may be rich in or substantially has one or more $C4^-$ hydrocarbons.

Another stream 60 may be combined with the hydrocarbon stream 50. Typically, the another stream 60 is a solvent stream and includes about 1:2-about 2:1 of an alkali:alkanolamine solution with the balance water. The alkali can include at least one of potassium hydroxide, sodium hydroxide, and ammonia, and the alkanolamine may include at least one of monoethanolamine, diethanolamine, and methyl diethanolamine, preferably monoethanolamine and/or diethanolamine A recycle stream 172, as hereinafter described, can be combined with the streams 50 and 60 to form a combined stream 70 provided to the prewash zone 140.

The prewash zone 140 can include a vessel 150, in turn, that may include a contacting zone 180 and a coalescing zone 200. In the prewash zone 140, hydrogen sulfide can be removed and converted into, e.g., one or more sulfide compounds, such as sodium sulfide. Often, the contacting zone 180 has a structured packing, at least one of a fiber and film contactor, and one or more trays. In this exemplary embodiment, the contacting zone 180 includes one or more trays 190, preferably tray packing or bubble trays. The coalescing zone 200 may include a hydrophilic media, such as a metal mesh having a hydrophilic coating, a mesh including one or more metal wires, such as stainless steel, or fiberglass, or one or more vanes or other structured packing. One exemplary mesh may include a coating sold under the trade designation COALEX or KOCH-OTTO YORK™ separations technology by Koch-Glitsch, LP of Wichita, Kans. In this exemplary embodiment as depicted, the coalescing zone 200 includes a coated mesh 210.

The extraction zone 230, which can include an extraction vessel 234, can be downstream of the prewash zone 140 and may facilitate the extraction of sulfur compounds, such as thiol compounds, from one or more hydrocarbons by e.g., converting at least some of the thiol compounds to disulfide compounds. Often, this contact is facilitated by providing a lean alkali stream 224. The lean alkali stream 224 may be at least partially supplied by regenerating a rich alkali stream 218 withdrawn from a base of the extraction vessel 234. The rich alkali stream 218 can be sent to an alkali regeneration zone 260, which may include an oxidation vessel and a disulfide separator. An exemplary extraction vessel, oxidation vessel, and disulfide separator are disclosed in, e.g., U.S. Pat. No. 7,381,309.

In one exemplary operation, a gas phase hydrocarbon stream 50, the solvent stream 60, and the recycle stream 172 may be merged to form the combined stream 70. The combined stream 70 may be provided to the vessel 150. The fluids may fall to and through the contacting zone 180 having the one or more trays 190. A liquid phase 156 may form at the bottom of the vessel 150 forming an interface 152 with a gas phase 154. The liquid phase 156 can exit the vessel 150 as a bottom stream 164 and split into a purge stream 168 and the recycle stream 172. A control valve 160 can communicate with a level controller 158 to maintain a level of the liquid phase 156 in the vessel 150. The recycle stream 172 can be provided to a suction of a pump 174 and discharged to be combined with the streams 50 and 60. The gases from the gas phase may rise and pass through the coalescing zone 200 including the hydrophilic coated mesh 210. Any droplets entrained in the gases may coalesce and drop to the bottom of the vessel. The prewashed hydrocarbon stream 214, typically in a gas phase, can be passed as a gas stream 214 to the extraction zone 230 and be contacted with the lean alkali stream 224. A hydrocarbon product stream 240 may be withdrawn from a top of the extraction vessel 234, and the rich alkali stream 218 can be withdrawn from a bottom of the extraction vessel 234 and provided to the alkali regeneration zone 260 for providing, at least in part, the lean alkali stream 224. The lean alkali stream 224 can be provided to the extraction vessel 234 and optionally be comprised in at least a portion of the another stream 60.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for removing carbonyl sulfide in a gas phase hydrocarbon stream, comprising:
   A) combining the gas phase hydrocarbon stream comprising carbonyl sulfide with another stream comprising an alkali, in turn comprising, at least one of potassium hydroxide, sodium hydroxide, and ammonia, and an alkanolamine; and
   B) passing the combined stream to a prewash zone comprising a vessel; wherein the vessel contains a contacting zone wherein the contacting zone comprises one or more trays and a coalescing zone for removing the carbonyl sulfide.

2. The process according to claim 1, wherein the contacting zone comprises a structured packing, and at least one of a fiber and film contactor.

3. The process according to claim 2, wherein the contacting zone comprises one or more bubble trays.

4. The process according to claim 1, wherein the coalescing zone comprises at least one of a mesh and one or more vanes.

5. The process according to claim 4, wherein the coalescing zone comprises the mesh wherein the mesh comprises a coating.

6. The process according to claim 5, wherein the coating comprises a hydrophilic coating.

7. The process according to claim 1, wherein the coalescing zone comprises a mesh wherein the mesh comprises one or more metal wires or fiberglass.

8. The process according to claim 1, further comprising passing a gas stream from the vessel to an extraction zone.

9. The process according to claim 1, wherein the gas phase hydrocarbon stream comprises about 5- about 500 ppm, by weight, of carbonyl sulfide.

10. The process according to claim 8, further comprising obtaining a hydrocarbon product stream from the extraction zone.

11. The process according to claim 8, further comprising passing an alkali stream from the extraction zone to a regeneration zone.

12. The process according to claim 11, further comprising passing at least a portion of a regenerated alkali stream to the prewash zone.

13. The process according to claim 1, wherein the alkanolamine comprises at least one of monoethanolamine and diethanolamine.

14. A process for removing at least one of carbonyl sulfide and hydrogen sulfide in a gas phase hydrocarbon stream, comprising:
   A) combining the gas phase hydrocarbon stream comprising carbonyl sulfide with another stream comprising an alkali and an alkanolamine; and
   B) passing the combined stream to a prewash zone comprising a vessel; wherein the vessel contains a one or more trays and a coated mesh for removing at least one of the carbonyl sulfide and hydrogen sulfide.

15. The process according to claim 14, wherein the alkali comprises at least one of an ammonia, a potassium hydroxide and a sodium hydroxide.

16. The process according to claim 14, wherein the alkali comprises the potassium hydroxide.

17. The process according to claim 14, wherein the alkali comprises the sodium hydroxide.

18. The process according to claim 14, wherein the alkanolamine comprises at least one of monoethanolamine, diethanolamine, and methyl diethanolamine.

19. The process according to claim 14, wherein the gas phase hydrocarbon stream comprises one or more $C4^-$ hydrocarbons.

* * * * *